United States Patent [19]

Rottenkolber et al.

[11] Patent Number: 4,585,094
[45] Date of Patent: Apr. 29, 1986

[54] HYDRAULIC RIM BRAKE FOR BICYCLES

[75] Inventors: Ludwig Rottenkolber, Urach; Manfred Schwab, Lenningen, both of Fed. Rep. of Germany

[73] Assignee: Gustav Magenwirth GmbH & Co., Fed. Rep. of Germany

[21] Appl. No.: 657,769

[22] Filed: Oct. 4, 1984

[30] Foreign Application Priority Data

Oct. 5, 1983 [DE] Fed. Rep. of Germany ....... 3336123

[51] Int. Cl.[4] ............................................. B62L 1/10
[52] U.S. Cl. ................... 188/24.22; 92/177; 188/72.3; 188/72.4; 188/344; 188/370; 267/174; 267/176
[58] Field of Search ............... 188/24.11, 24.12, 24.13, 188/24.16, 24.19, 24.22, 26, 216, 370, 72.3, 72.4, 72.5, 73.46, 250, 344, 205; 267/166, 174, 176, 170, 179; 92/177, 239, 136, 139, 233, 165 PR, 166, 246, 240, 192, 75

[56] References Cited

U.S. PATENT DOCUMENTS

| 570,528 | 11/1896 | Wyeth | 92/165 PR |
|---|---|---|---|
| 2,257,417 | 9/1941 | Kelley | 92/177 X |
| 2,363,605 | 11/1944 | McLintock | 92/177 X |
| 2,524,850 | 10/1950 | Stevenson et al. | 92/165 PR |
| 2,983,256 | 5/1961 | Seeloff | 92/177 X |
| 3,140,759 | 7/1964 | Cagle | 188/72.3 |
| 3,207,010 | 9/1965 | Wendling | 267/179 X |
| 3,441,052 | 4/1969 | Schilling | 267/174 X |
| 3,490,343 | 1/1970 | Afanador et al. | 188/370 X |
| 3,554,334 | 1/1971 | Shimano et al. | 188/24.16 |
| 3,776,333 | 12/1973 | Mathauser | 188/344 |
| 3,805,933 | 4/1974 | Pray | 92/165 PR X |
| 3,935,930 | 2/1976 | Kine | 188/344 |
| 4,016,960 | 4/1977 | Wilcox | 92/165 PR X |
| 4,073,272 | 2/1978 | Burgess | 92/165 PR X |
| 4,136,759 | 1/1979 | Schoch | 188/72.3 X |
| 4,445,840 | 5/1984 | Kenmochi | 92/177 X |
| 4,488,761 | 12/1984 | Buell | 188/344 X |

FOREIGN PATENT DOCUMENTS

| 202024 | 6/1955 | Australia | 188/216 |
|---|---|---|---|
| 2406607 | 9/1974 | Fed. Rep. of Germany | 188/216 |
| 343644 | 10/1904 | France . | |
| 344799 | 11/1936 | Italy | 188/344 |
| 345862 | 1/1937 | Italy | 188/344 |
| 621342 | 4/1949 | United Kingdom | 188/344 |
| 1405576 | 9/1975 | United Kingdom . | |

Primary Examiner—Douglas C. Butler
Attorney, Agent, or Firm—Shenier & O'Connor

[57] ABSTRACT

The invention relates to a hydraulic rim brake for bicycles with a triggering mechanism which is attached to the handlebar of the bicycle and is actuated by a hand lever, with two brake cylinder housings which are attached to the frame of the bicycle in oppositely located relationship to each other and enclose between them a wheel rim, the brake cylinder housings being connected by pressure lines to the triggering mechanism, with pistons displaceable in the brake cylinder housings, and with brake shoe supports arranged on these pistons for supporting brake shoes engaging the rim. In order to protect the piston from the effect of harmful bending moments, provision is made for the brake shoe supports to be in the form of flanges which are connected to the piston and are each displaceable parallel to the motion of the brake piston in a slide guide provided on the brake cylinder housing, and for the slide guide to simultaneously constitute abutments for absorption of the braking forces.

4 Claims, 8 Drawing Figures

HYDRAULIC RIM BRAKE FOR BICYCLES

The invention relates to a hydraulic rim brake for bicycles with a triggering mechanism which is attached to the handlebar of the bicycle and is actuated by a hand lever, with two brake cylinder housings which are attached to the frame of the bicycle in oppositely located relationship to each other and enclose between them a wheel rim, said brake cylinder housings being connected by pressure lines to the triggering mechanism, with pistons displaceable in the brake cylinder housings, and with brake shoe supports arranged on these pistons for supporting brake shoes engaging the rim.

In known brakes of this kind (British Pat. No. 1,405,676, French Patent No. 343,644), the brake shoe supports extend freely and comparatively far out of the brake cylinder housings. This may cause the piston to become subject to substantial bending moments during braking, which in the long term may impair the easy running of the rim brake and, consequently, constitute a safety risk.

The object underlying the invention is to remedy this deficiency and to absorb the braking forces occurring at the brake shoe support in such a way that they cannot impair the guidance of the piston in the brake cylinder housing.

The object is attained in accordance with the invention in that the brake shoe supports are flanges which are connected to the piston and are each displaceable in a slide guiding means provided on the brake cylinder housing, parallel to the motion of the brake piston, and in that the slide guiding means simultaneously constitute abutments for absorption of the braking forces.

The following description of preferred embodiments, with reference to the appended drawings, serves to explain the invention in greater detail.

Figure 1:
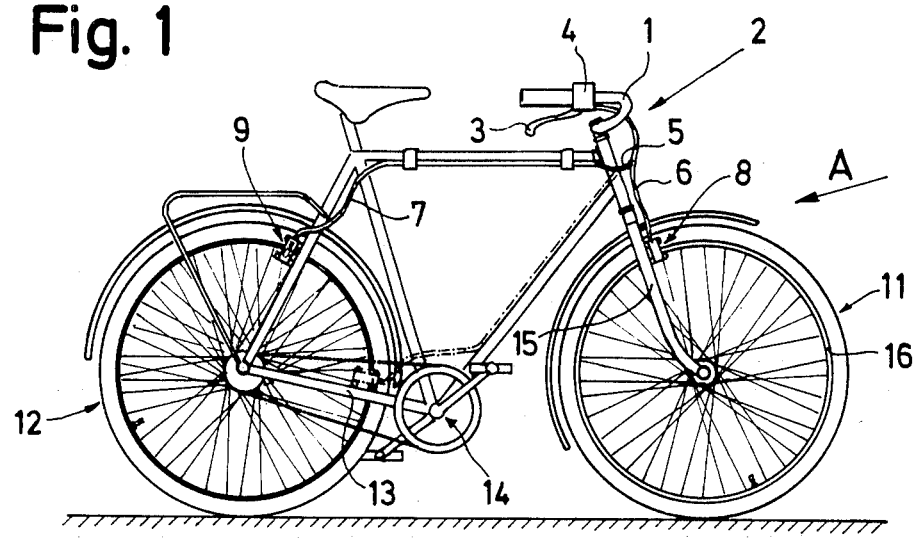
FIG. 1 shows a side view of a bicycle with hydraulic rim brakes.

A hydraulic triggering mechanism 4, operated by a hand lever 3, is arranged on the handlebar 1 of the bicycle 2 depicted in FIG. 1. The triggering mechanism 4 comprises in a manner known per se a master cylinder and a piston displaceable therein by the hand lever 3. The triggering mechanism 4 is connected via pressure lines 5, 6 or 7 to hydraulic rim brakes which engage the rims of the front or rear wheels 11 and 12 of the bicycle. When the triggering mechanism 4 is actuated, the rim brakes 8 or 9 are activated in a manner known per se, so that their brake shoes engage either side of the rims of the wheels 11 and 12. The rim brake 8 is attached to the fork of the front wheel 11, the brake 9 to the fork of the rear wheel 12. As shown by a dot-and-dash line in FIG. 1, the rim brake arranged on the rear wheel 12 may also be attached to a frame section 13 of the bicycle which connects the pedal crank 14 with the axle of the rear wheel 12.

Figure 2:
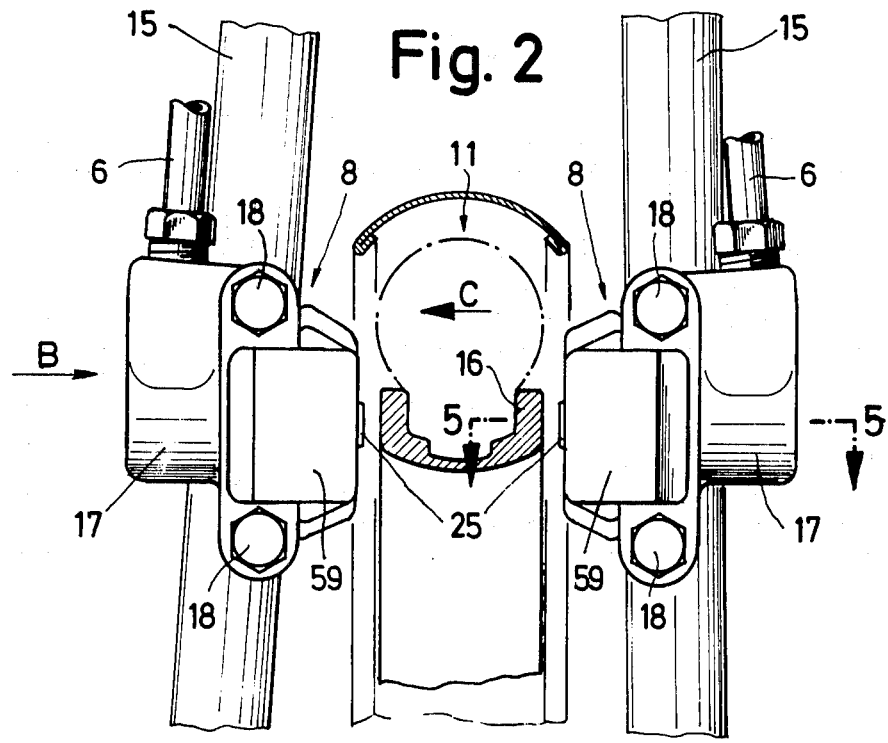
FIG. 2 shows a sectional front view of the rim brake in the direction of arrow A in FIG. 1.
Figure 3:
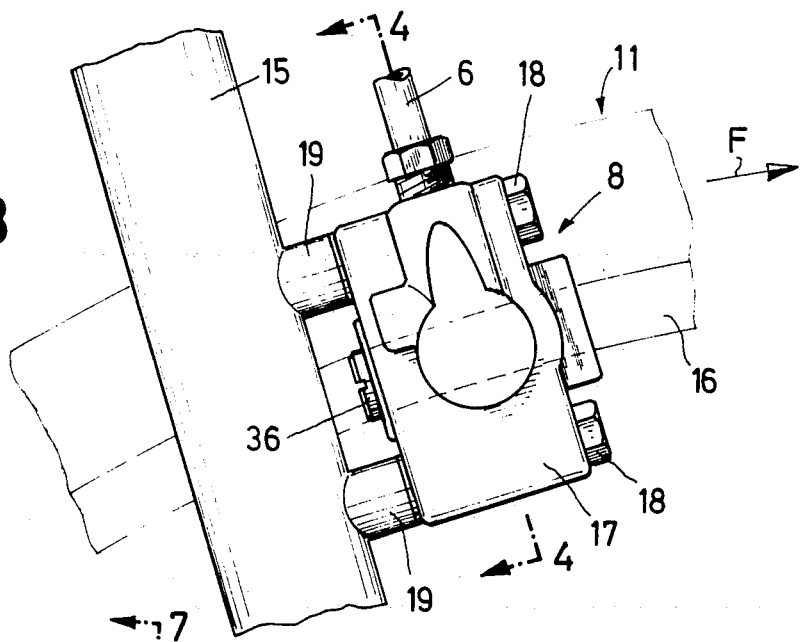
FIG. 3 shows a view in the direction of arrow B in FIG. 2.

As is evident from FIG. 2, the rim brake 8 comprises two brake cylinder housings 17 which are attached to the front wheel fork 15 in oppositely located relationship to each other and enclose between them the wheel rim 16 of the front wheel 11, said brake cylinder housings being connected to the triggering mechanism 4 by the pressure lines 6, which are preferably in the form of tubes. The brake cylinder housings 17 are attached to the front wheel fork 15 by screws 18, and corresponding attachment lugs 19 may be provided on the fork 15—see FIG. 3.

Figure 4:
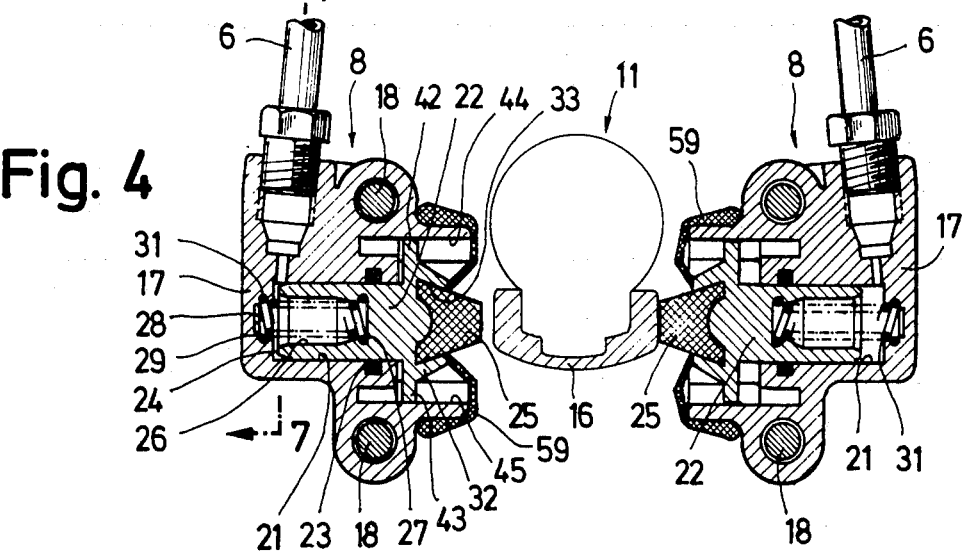
FIG. 4 shows a sectional view taken along line 4—4 in FIG. 3.
Figure 5:
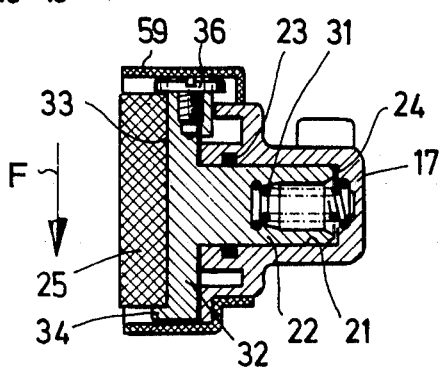
FIG. 5 shows a sectional view taken along line 5—5 in FIG. 2.

As is best seen from FIG. 4, a piston 22 is slideably mounted and sealed by a sealing means 23 in a bore 21 of each brack cylinder housing 17. On actuating the triggering mechanism 4, a hydraulic medium can be introduced at the piston rear side, designated by the reference numeral 24, via the pressure line 6, so that the piston 22 moves towards the rim 16. Attached to the front side of the piston 22, in a manner to be described hereinafter, is a brake shoe 25 which engages the rim 16 and thereby effects braking of the wheel. In the case of the right-hand brake cylinder housing 17 in FIG. 4, it is assumed that the triggering mechanism 4 is actuated and the brake shoe 25 is consequently in engagement with the rim 16. (In reality, of course, both shoes 25 engage the wheel rim 16 when the brake is actuated.)

The piston 22 comprises a blind bore 26 which is open towards its rear side 24 and expands on its closed side to an undercut 27. The brake cylinder housing 17 comprises a blind bore 28 which is coaxial with the bore 26 and is similarly provided with an undercut 29 at its closed end. The two aligned bores 26, 28 accommodate a cylindrical helical tension spring 31 whose both end threads have a larger diameter than the remaining threads. The external diameter of these end threads corresponds to the internal diameter of the undercuts 27, 29, while the diameter of the remaining spring threads is smaller than the diameter of the bores 26, 28. When the helical spring 31 is inserted into the bores 26, 28, and piston and brake cylinder housing are pressed together, the end threads of the spring 31, on account of their elastic deformability, snap into the undercuts 27 and 29, so that brake cylinder housing 17 and piston 22 are now connected to each other by the helical tension spring 31. The helical spring 31 acts as return spring and returns the piston to its initial position (FIG. 4, left) upon termination of a braking procedures. The bores 26, 28 with their undercuts are arranged in such a way that the end threads of the helical spring 31 are easily pressed in, but are difficult to pull out again.

The piston 22 comprises on its front side a laterally protruding flange 32 acting as brake shoe support to which the brake shoe 25 is attached. For this purpose, the flange 32 comprises a dovetail groove 33 into which the correspondingly profiled brake shoe 25 is inserted. The brake shoe 25 hits at its end face a stop member 34 of the flange 32. After insertion, the brake shoe 25 is prevented from moving in a rearward direction and falling out by the head of a screw 36. The brake shoe 25 is inserted into the dovetail groove 33 in the direction of travel (arrow F) of the bicycle so that during braking the brake shoe 25 is pressed against the stop member 34.

Figure 7:
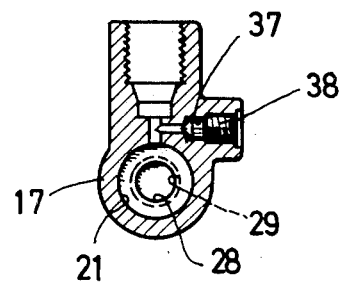
FIG. 7 shows a sectional view taken along line 7—7 in FIG. 4.

The brake cylinder housing 17 further comprises (see FIG. 7) an aeration bore 37 into which a screw plug 38 is screwed. The aeration bore 37 is normally pressure sealed by the screw 38 and is only opened when the system is filled with hydraulic medium.

Figure 6:
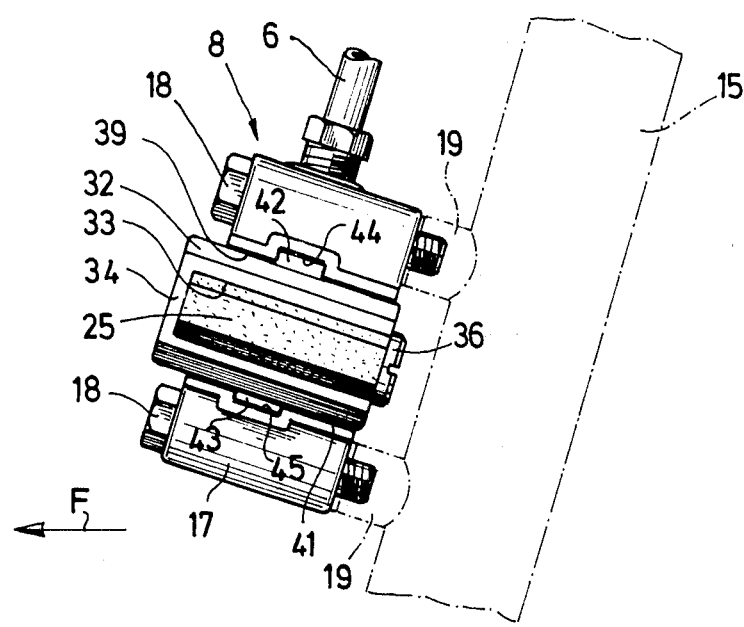
FIG. 6 shows a view in the direction of arrow C in FIG. 2.

As is evident from the drawings, vide, in particular, FIGS. 4 and 6, the brake cylinder housing 17 surrounds not only the piston 22 but also the flange 32 protruding therefrom in such a way that the housing forms a slide guiding means for this flange extending parallel to the motion of the brake piston. In the embodiment according to FIGS. 4 and 6, the substantially rectangular flange 32 is guided between surfaces 39, 41 arranged in parallel, opposed relationship to each other. At the flange 32, in the area of the surfaces 39, 41 are two projections 42, 43 in the form of tongues extending parallel to the axis of the piston 22 and engaging in a slideably displaceable manner corresponding recesses 44 and 45 in the form of grooves in the housing 17. In this way, the motion of the brake shoe 25 relative to the rim 16 is not obstructed. During a braking procedure, there occur braking forces acting in the direction of travel F (FIG. 6) which bring the flanks of the projections 42, 43 which are oriented in the direction of travel to rest against walls of the recesses 44 and 45 which face them. In this way, these walls of the slide guiding recesses act as abutments for absorption of the braking forces which occur. Since these braking forces are absorbed directly in the area of the flange 32 acting as brake shoe support, they cannot have an adverse effect in the area of the piston and the brake cylinder housing guiding it.

It is particularly advantageous if, as illustrated, both piston 22 and flange 32 are made in one piece, and the slide guiding means (recesses 44, 45) are integral with the brake cylinder housing 17.

The opposed, parallel surfaces 39, 41 of the slide guiding means, in combination with the corresponding surfaces of the projections 42, 43 and recesses 44, 45 furthermore also prevent the flange 32 connected to the piston 22 and the brake shoe 25 attached to it from twisting. Accordingly, the brake shoe 25 retains, in particular, also during the braking procedure, when substantial forces having a torsional effect may act upon it, its position relative to the rim 16, so that the full braking efficiency is always guaranteed.

Figure 8:
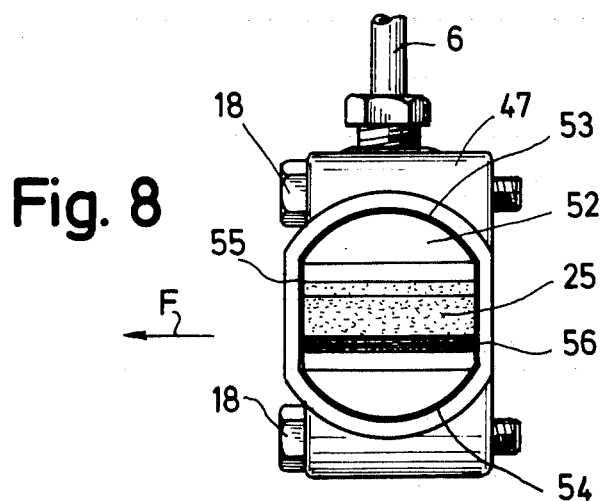
FIG. 8 shows a top view similar to FIG. 6 of another embodiment of a hydraulic rim brake.

The brake cylinder housing 47 shown in FIG. 8 corresponds in its basic design to the brake cylinder housing 17 which has been described. In FIG. 8, parts corresponding to each other are designated by the same reference numerals as in FIGS. 1 to 7. The essential difference from the embodiment according to FIGS. 1 to 7 consists in that the flange 52 connected to the piston of the brake is delimited by two circular cylindrical surfaces 53, 54 and flat faces 55, 56 of planar configuration interrupting these surfaces. The surfaces 53, 54, 55, 56 engage in a slideably displaceable manner a correspondingly designed internal contour of the brake cylinder housing 47, so that the flange 52—like the flange 32 of the embodiment according to FIGS. 1 to 7—is guided in a stable manner in a slide guiding means which in view of the direction of travel F simultaneously forms in the area of the planar surface 55 an abutment for absorption of braking forces which occur. This slide guiding means according to FIG. 8 furthermore also serves as torsion prevention means for the flange 52 and the brake shoe 25 connected to it since the circular cylindrical shape of the flange is interrupted by the two planar surfaces 55, 56, and the flange can, therefore, not become twisted in its guiding means.

The hydraulic rim brakes described are preferably attached to the frame of the bicycle in such a way that they are pressed against the frame by the forces which occur during braking. This applies in FIG. 1 to brake 9 and to the brake corresponding to it arranged on the frame section 13. The brake designated 8 in FIG. 1 is, however, in view of optimal alignment with the rim, arranged in such a way that it cannot be pressed against the fork 15 by braking forces which occur. Which arrangement of the hydraulic brakes is particularly advantageous must be decided in each individual case in view of the prevailing circumstances.

Finally, as is evident from the drawings, an elastically expandable bellows 59 which prevents penetration of dirt into the brake is arranged between the brake cylinder housing 17 and the flange 32 of the piston 22.

What is claimed is:

1. In a bicycle having a frame and handle bars and a wheel with a rim, a hydraulic brake assembly comprising a triggering assembly carried by one of said handle bars, a hand lever for actuating said triggering assembly, a pair of brake cylinder housings mounted on said frame in opposed relationship to each other on opposite sides of said wheel rim, pressure lines connecting said triggering assembly to said brake cylinder housing, pistons displaceable in said brake cylinder housings, a brake shoe support on one end of each of said pistons, a brake shoe on each of said supports for engaging said rim, each of said brake shoe supports being a flange connected to its associated piston and being displaceable parallel to the motion of the brake piston characterized in that slide guiding means (42, 43, 44, 45; 53, 54, 55, 56) are connected in a protruding manner to the ends of the brake cylinder housings (17, 47) facing the flanges (32, 52), said slide guiding means surrounding the outer side walls (42, 43; 55) of said flanges and including inner side walls (42, 45) oriented perpendicularly to the direction of travel (F) of the bicycle, said inner side walls (42, 45) resting against the outer side walls (42, 43; 55) of the flanges (32, 52) to act as abutments for absorbing braking forces to inhibit bending of parts, the peripheral inner contours of said slide guiding means and flanges surrounded by the slide guiding means being non-circular and complementary to inhibit relative twisting of the flanges and the slide guiding means.

2. A brake assembly as in claim 1 characterized in that said flange comprises at least one projection (42, 43) engaging a complementary recess (44, 45) in the slide guiding means of the brake cylinder housing (17).

3. A brake assembly according to claim 2 characterized in that an elastically expandable bellows (59) is arranged between the brake cylinder housing (17, 47) and the flange (32, 52) as a dirt protection means.

4. A brake assembly as in claim 1 characterized in that an elastically expandable bellows (59) is arranged between brake cylinder housing (17, 47) and the flange (32, 52) as a dirt protection means.

* * * * *